United States Patent [19]

Popiolek et al.

[11] 4,133,258

[45] Jan. 9, 1979

[54] DEVICE FOR BINDING A ROLLED BALE OF WINDROWED AGRICULTURAL CROP MATERIAL

[75] Inventors: Franz M. Popiolek; Jürgen Simonis, both of Wolfenbuttel, Germany

[73] Assignee: Gebruder Welger, Wolfenbuttel, Germany

[21] Appl. No.: 840,296

[22] Filed: Oct. 7, 1977

[30] Foreign Application Priority Data

Oct. 9, 1976 [DE] Fed. Rep. of Germany ....... 2645762

[51] Int. Cl.² ............................................ B65B 13/02
[52] U.S. Cl. ...................................................... 100/5
[58] Field of Search ............................... 100/5, 13, 88

[56] References Cited

U.S. PATENT DOCUMENTS

| | | | |
|---|---|---|---|
| 1,881,183 | 10/1932 | Griffith | 100/13 |
| 2,987,990 | 6/1961 | Mazza | 100/13 X |
| 3,064,556 | 11/1962 | Luebben | 100/5 |

Primary Examiner—Billy J. Wilhite
Attorney, Agent, or Firm—Toren, McGeady and Stanger

[57] ABSTRACT

A device for helically binding or wrapping a compacted rolled bale of windrowed agricultural crop material with twine, the crop material is rolled and compressed into a bale in a baling machine which includes a pair of spaced rolling members supported between a pair of spaced side walls of the baling machine. The rollers extend across the width of the machine and the gap between the spaced rollers forms the inlet through which the crop material is fed into the baling machine. A twine guide assembly, for guiding a strand of twine into and along the gap between the rollers, is mounted for movement in a straight linear path along and parallel to the gap formed between the rollers so that the twine can be uniformly fed to the bale.

17 Claims, 8 Drawing Figures

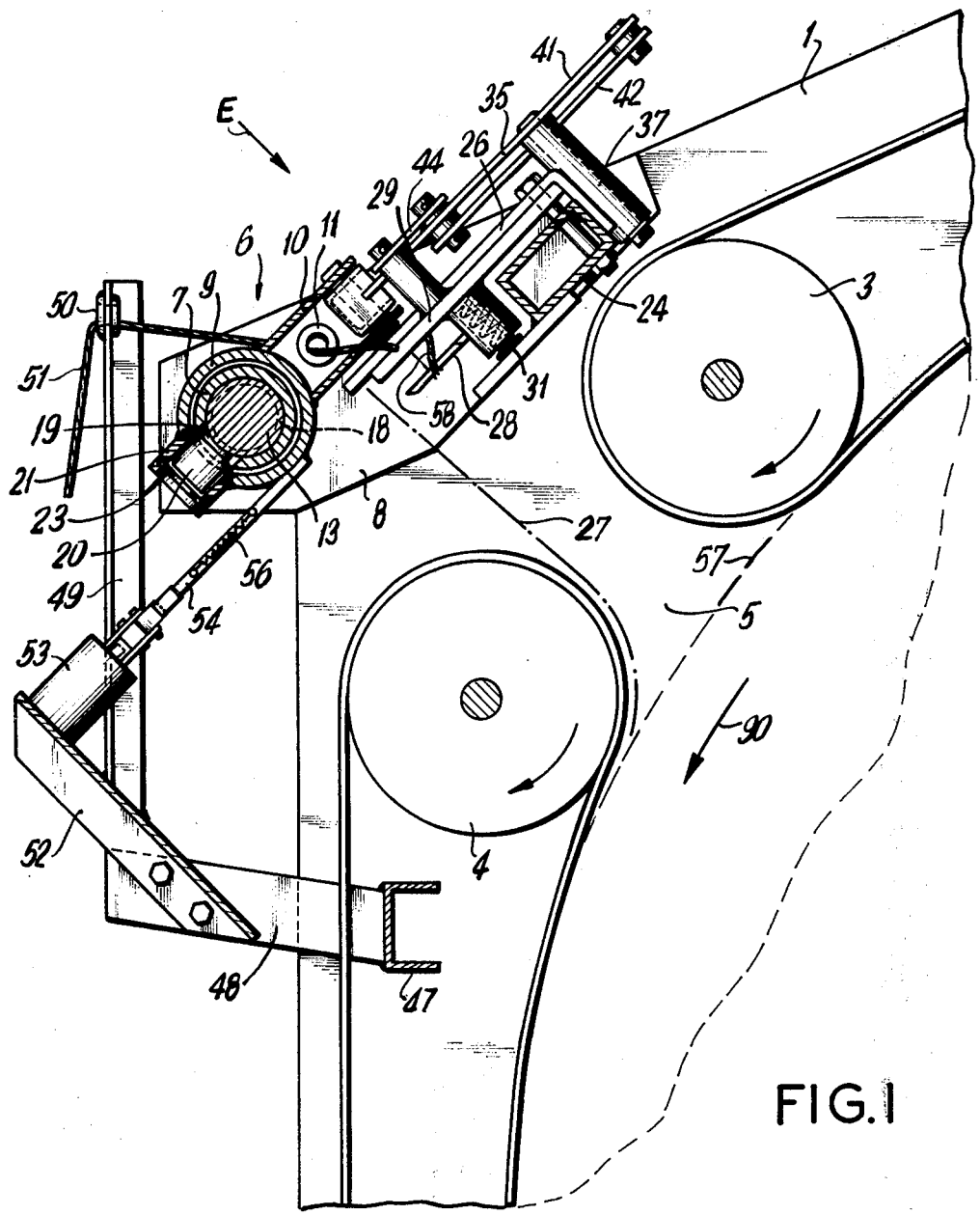
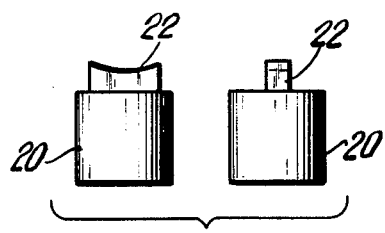
FIG.1
FIG.2

DEVICE FOR BINDING A ROLLED BALE OF WINDROWED AGRICULTURAL CROP MATERIAL

BACKGROUND OF THE INVENTION

The present invention relates to a device for helically binding a rolled bale of windrowed agricultural crop materials which are compacted in a rolling press formed by a substantially cylindrical housing. More particularly, the invention relates to a binding device having a wrapping element or twine guide assembly for guiding a strand of twine into a gap formed between a pair of rollers extending across the width of the cylindrical housing and having a cutter device operatively controlled by movement of the twine guide assembly.

Devices for binding a rolled bale may comprise a pivotally mounted twine guiding arm supported at the housing of the rolling press. A strand of twine is fed from a twine ball through the guiding arm into an opening in the housing to be wrapped about the material being compacted. For the twine guiding arm to move in a semicircular path of motion across the entire housing width, it must have a length which is substantially half the width of the housing. The arm must also be supported at a sufficient distance in front of the opening for the arm to move across the entire housing. A bearing is required to support the twine guiding arm in a pivotal position in front of the housing. Such a bearing occupies a significant amount of space and requires an expensive projection to be built in front of the housing. The opening in the housing for receiving the twine must be of considerable size for the strand of twine to be moved back and forth to cover the entire length of the bale. The strand of twine can only be picked up either by the material of the compressed bale, or by rolling press bands within the press housing, or by rollers within the press when the twine guiding arm is in a center position. Therefore, the binding of the bale cannot commence with the twine at one end of the bale. Further, this device causes the spacing of the windings on the bale to be irregular, even when the pivotal motion of the twine guiding arm is uniform. The spacings between windings of twine on the bale will be large at the center but narrow at the sides because of the pivoting action. Binding the bale with uniform spacing between the windings can only be accomplished by a manual operation of the pivoting arm by exercising extreme care in the movement and actuation of the swiveling mechanism.

It is, therefore, the object of the present invention to provide a device having means for guiding a strand of twine to a rotating bale of agricultural crop material being compressed in a rolling compacting press, such as used on farm vehicles to produce bales in the fields, in order to wind the twine about the bale to wrap the bale with equal spacing between windings, even when automatic means are used for controlling the twine feeding and guiding mechanism of the device. It is also an objective of the invention to be able to provide such a device which facilitates the commencement of the winding process with the strand of twine at one end of the bale. The present invention further seeks to provide means whereby the strand of twine can be grasped for attachment to the bale to commence the winding process, under all operating conditions, in a rapid and trouble free manner. It is also important to be able to provide means for feeding the twine into the housing of the press not only at a draw-in opening, but also at other gaps of smaller height. Finally, it is an objective of the invention to provide a device of the foregoing type keeping construction costs at a minimum.

Other objects, features and advantages of the present invention will become more apparent from the description of the invention in connection with the accompanying drawings, which will be described more fully hereinafter.

SUMMARY OF THE INVENTION

The aims and objectives of the invention are accomplished by providing a twine guide assembly movably mounted at a cylindrical housing of a press used for compressing agricultural material into a rotating bale and comprising a pair of spaced rollers extending across the width of the housing and forming a gap, the twine guide assembly being adapted for guiding a strand of twine into and along the gap between the rollers, a cutter device operatively controlled by movement of the twine guide assembly, and means supporting the twine guide assembly for movement in a straight linear or rectilinear path parallel to the gap between the rollers.

The provision of the means for supporting the twine guide assembly for movement in a straight path parallel to the gap between the rollers allows the binding device to be arranged close to the housing of the compacting press. Additionally, provision for movement of the twine guide assembly in a straight line parallel to the gap permits uniform feeding of the twine into and along the gap to achieve uniform spacing of the windings about the bale being rolled and compressed within the cylindrical housing (i.e. the press). Also, the device, according to the present invention, allows the winding of the bale to be started at one end of the bale, and also permits the use of a gap for receiving the twine having a smaller height as the usual draw-in gap. A further advantage of the present invention is that the straight linear motion of the twine guide assembly requires a simpler type automatic drive than the type of drive that would be required for a swivel type oscillating guiding arm.

A particularly advantageous arrangement of the present invention is to support the twine guide assembly on a cross member carried between side walls of the press housing and to provide means such as a screw spindle or a chain drive engaging the twine guide assembly to cause movement of the twine guide assembly axially along the cross member. This arrangement allows for a very simple design of the system for guiding the twine to the bale and for a very trouble-free means of automatically controlling the operation of the device.

In one particular space saving and simple arrangement, the twine guide assembly is a cylindrical member slidably carried on a tubular member supported between the side walls of the press housing. A reversible screw spindle is rotatably carried within the tubular member. The tubular member has a longitudinally extending slot through which a cam follower attached to the twine guide assembly will extend for engagement with the screw spindle. In this manner, rotational movement of the screw spindle within the tubular member can be translated into linear movement of the twine guide assembly along the tubular member. The extension of the cam follower through the longitudinally extending slot in the tubular member prevents rotational movement of the twine guide assembly about the tubular member.

Instead of providing a separate tubular member and a screw spindle carried within the tubular member, the cylindrical twine guide assembly can be carried directly on a screw spindle having reversible guide slots. In this arrangement, the reversible screw spindle is carried between the side walls of the press housing and a cam follower attached to the twine guide assembly engages the guide slots of the reversible screw spindle. In order to prevent rotational movement of the twine guide assembly about the screw spindle, a separate guide rail can be connected between the side walls of the press housing, with a guide element attached to the twine guide assembly to cooperate with and ride along the separate guide rail.

Instead of using a screw spindle to cause axial movement of the yarn guide assembly along the cross member, a chain or belt drive arrangement can be mounted between the side walls of the press housing to traverse the entire width of the housing. Appropriate follower means can be provided on the chain or belt drive to engage the twine guide assembly and cause it to move axially along the cross number as the chain or belt drive is operated.

A separate electrical or mechanical drive means can be carried on the press housing for driving the screw spindle or the chain or belt drive. Accordingly, the twine guide assembly can be axially moved along the cross member by either the screw spindle or chain drive as a result of the separate electrical or mechanical drive means. Alternately, the twine guide assembly can be provided with an electrical or mechanical drive mechanism for moving it axially along the cross member. Such a drive mechanism carried directly by the twine guide assembly may take the form of a rack and pinion drive arrangement.

The drive for the screw spindle, chain drive, or other mechanism for causing axial movement of the twine guide assembly along the cross member can be actuated manually by the operator of the press or of the vehicle driving the press, and separate means can be provided for automatically disconnecting the drive when the winding process is complete.

One advantageous feature of the invention which results in waste prevention and cost saving is the provision of an actuating member carried by the twine guide assembly for controlling the operation of a pivotally mounted clamping element carried by the cutter device which holds the twine in a ready tensioned position prior to the commencement of the winding operation and which can be moved into a relaxed position during the winding operation. A pair of control levers supported between the side walls of the press housing are connected with the clamping element and operated by the actuating member. The actuating member carried by the twine guide assembly engages the levers as it moves along the cross member to move the cutting device into an operating position. This takes place when the twine guide assembly has moved to a position adjacent one of the side walls of the press housing. The actuating member of the twine guide assembly sets the cutter device back into an initial position after the twine guide assembly has moved along the cross member to the other side of the housing of the press and then back again toward the first side wall of the housing. This allows the twine to be wrapped about one end of the bale to form an end binder winding. This arrangement aids in the prevention of twine waste in the binding process by insuring that the cut ends of the twine are not inadvertently released.

A relatively simple arrangement for automatically disengaging the drive for the binder device is provided by a cutout switch carried on the frame of the press housing. Actuation of the cutout switch to disengage the drive is effected by a switching arm carried on the twine guide assembly which engages the cutout switch just prior to the actuating member carried by the twine guide assembly engaging one of the control levers to move the clamping element into a clamping position to hold a cut end of the twine.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 is a cross-sectional view taken along lines A-B-C-D of FIG. 3, illustrating the binding device of the present invention carried on a press housing for binding a bale compressed in the housing;

FIG. 2 illustrates the cam follower used in the twine guide assembly, the figure on the left being a front elevational view of the cam follower, the figure on the right being a side elevational view of the cam follower;

DESCRIPTION OF THE INVENTION

Referring now in more detail to the accompanying drawings and with particular reference to FIG. 1, a portion of a rolling press, for compacting windrowed crop material into a bale 57, is illustrated. For the sake of convenience, the left side of the figure will be referred to as the "front side" of the press and the top portion of the figure will be referred to as the "top" or "upper part" of the press.

Figure 3:
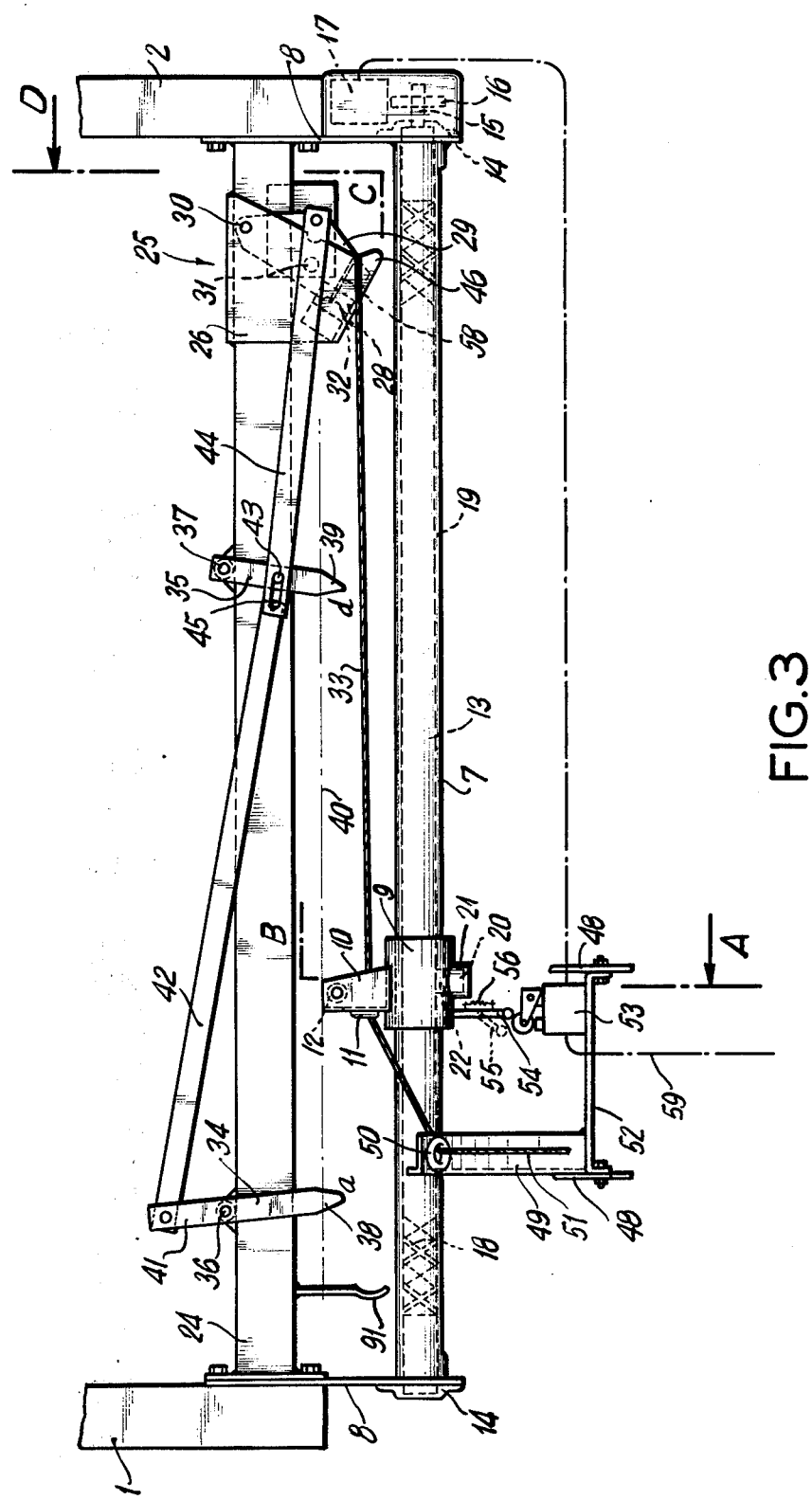
FIG. 3 is a front view of the binding device according to the present invention, taken in the direction of arrow E in FIG. 1, showing the twine guide assembly and cutter device in an initial or starting position.

FIGS. 1-3 illustrate an embodiment of the binding or wrapping device according to the present invention and used on the rolling press for helically winding twine about the bale 57 to bind the compacted crop material. Accordingly, two rollers 3 and 4 of the rolling mechanism are located in the front area of the rolling press supported between the side walls 1 and 2 of the press. Rollers 3 and 4 are spaced apart forming a gap 5 therebetween. The binding device 6 is located immediately above the gap 5 and on the front side of the press. The binding device 6 includes a tubular guide member 7 carried between the support frames 8 mounted on the opposite side walls 1 and 2. The tubular guide member 7 extends between the frames 8 parallel to the rollers 3 and 4.

A twine guide assembly 9 is carried on the tubular guide member 7 for sliding movement therealong. The twine guide assembly 9 is cylindrically shaped in order to be slidably carried on the tubular member 7 and carries an extension arm 10. A twine guiding eye 11 is formed in the extension arm 10 for guiding the twine. Extension arm 10 also carries a roller 12 which operates as an actuating member as will be appreciated more fully hereinafter. FIG. 1 shows extension arm 10 as being directed away from the cylindrical assembly 9 upwardly and toward the rear of the press. Accordingly, twine guiding eye 11 is positioned approximately vertically above the lower feed roller 4 and in front of the gap 5.

A reversible screw spindle 13, having guide slots 18, is rotatably supported in bearings 14 on the support frames 8 and extends axially through tubular guide member 7. There are two sets of continuous guide slots 18. One set extends helically about spindle 13 in a first direction and the other set extends helically about spindle 13 in an opposite direction. The end of the spindle 13 which is supported on the frame 8 connected to side wall 2, carries a pivot pin 15 which is connected to an electrical driving motor 17 through a spur gear 16. In this manner, the reversible screw spindle 13 can be rotated in a continuous direction. The guide slots 18 on the reversible screw spindle 13 extend across the entire surface of the screw spindle up to a distance of approximately 100 millimeters from each of the side walls 1 and 2. In order to cause twine guide assembly 9 to move longitudinally along the tubular guide member 7, either toward the right or left of the figure, a cam follower 20 is carried in a socket 21 on the twine guide assembly 9. The cam follower 20 extends radially toward the center of the guide assembly 9 and carries a relatively flat cam member 22 for engaging the guide slots 18 on the spindle 13. Spring means in the form of a guard ring or circlip 23 is carried in socket 21 and acts on the cam follower 20 in order to urge the cam member 22 into engagement with the slots 18. Accordingly, when the screw spindle 13 is rotated by motor 17, the guide assembly 9 moves axially along the tubular member 7 as a result of the cam member 22 on cam follower 20 engaging the slots 18. To restrain the guide assembly 9 from rotational movement with the spindle, tubular member 7 is provided with a longitudinally extending slot 19. Cam follower 20 extends through the slot 19 and, because it will engage the edges of the slot, rotational movement of spindle 13 within the tubular member 7 will cause only axial rectilinear movement of the guide member 9 along the tubular member 7.

A cross member 24 is supported between the side walls 1 and 2 and is arranged parallel to the tubular member 7. It will be appreciated from FIG. 1 that cross member 24 is oriented at an angle with respect to the vertical. Cross member 24 carries a twine cutter device 25 and control levers for operating the twine cutter device. A cover plate 26 is attached to the cross member 24 and extends in a direction tranverse to the path 27 of twine being fed through the gap 5. A cutter 28 is attached to the cross member 24 having its cutting edge directed toward the path of the binding twine. A gap is formed between the cover plate 26 and the cutter 28. A clamping element 29 is pivotally carried on a bolt 30 for pivotal movement in the gap between the cover plate 26 and the cutter 28 between a clamped position for holding the twine and a released position. A spring 31 biases the clamping element 29 against the cover plate 26. The clamping element 29 is provided with a recess 32 which guides a strand of twine 33 against the cutter 28 upon pivotal movement of the clamping element 29.

Two control levers 34 and 35 are operatively linked with the clamping element 29 for causing pivotal movement thereof at predetermined positions of the twine guide assembly 9 along the tubular member 7. Control levers 34 and 35 are pivotally supported on cross member 24 in bearings 36 and 37, respectively, and each has a control nose 38 and 39. The noses 38 and 39 are directed generally downwardly and project into the path of travel 40 of extension arm 10 and roller 12. Accordingly, axial movement of the twine guide assembly 9 along the tubular member 7 causes the control roller 12 on the extension 10 to engage noses 38 and 39 of the control levers 34 and 35. Control lever 34 has a projecting part 41 extending on the opposite side of bearing 36 from the nose 38. A first coupler rod 42 is pivotally linked at one end to the distal end of the lever part 41. The other end of coupler rod 42 extends to the control lever 35 and is pivotally supported thereon by pivot 43 located between the bearing 37 and nose 39. Pivotal movement of control lever 34 in one direction about bearing 36 causes pivotal movement of control lever 35 about bearing 37 in the opposite direction. This is a result of coupler rod 42 being connected to control lever 35 at a point intermediate the bearing 37 and nose 39, while being connected to control lever 34 at the distal end of part 41.

A second coupler rod 44 is supported by the pivot 43 on control lever 35 in an oblong slot 45 at one end thereof. The other end of the second coupler rod 44 is pivotally connected to the clamping element 29. In this manner, the clamping element 29 will be pivoted about bolt 30 in the same rotational direction in which control lever 35 is pivoted about bearing 37. Oblong slot 45 provides a degree of lost motion so that clamping element 29 retains some freedom of pivotal movement to the extent of the length of the slot.

Cover 26 has a nose 46 which projects over the clamping element 29 and is directed against movement of the strand of twine 33. The nose 46 serves to guide the twine 33 during the completion of the binding process. A stop member 91, having a curved hook end, is carried on cross member 24 near the side wall 1 for guiding the twine during the beginning stages of the binding process.

Bearing 36 for control lever 34 is located approximately 100-200 millimeters from side wall 1, and bearing 37 for control lever 35 is positioned approximately 250 millimeters from the cutter device 25.

A cross member 47 is carried on the press housing and supports a carrier arm 48. A bar 49 is attached to the carrier arm 48, and a twine guiding eye 50 is positioned at the end of the bar 49 remote from its connection to the carrier arm 48. Guiding eye 50 serves to guide a strand of twine 51 to the twine guiding eye 11 of the twine guide assembly 9 from a ball not shown. An electrical cutout switch 53 is mounted on a bracket 52 which is also connected to the carrier arm 48. The cutout switch 53 is operated by a switching arm 54 carried on the twine guide assembly 9. The switching arm 54 is movable between the solid line position shown in FIG. 3 and the position shown in phantom line indicated as reference numeral 55. Arm 54 is biased in the direction of the solid line position by spring 56. Cutout switch 53 is located a distance from side wall 1 somewhat greater than the distance that control lever 34 is located from side wall 1.

Figure 4:
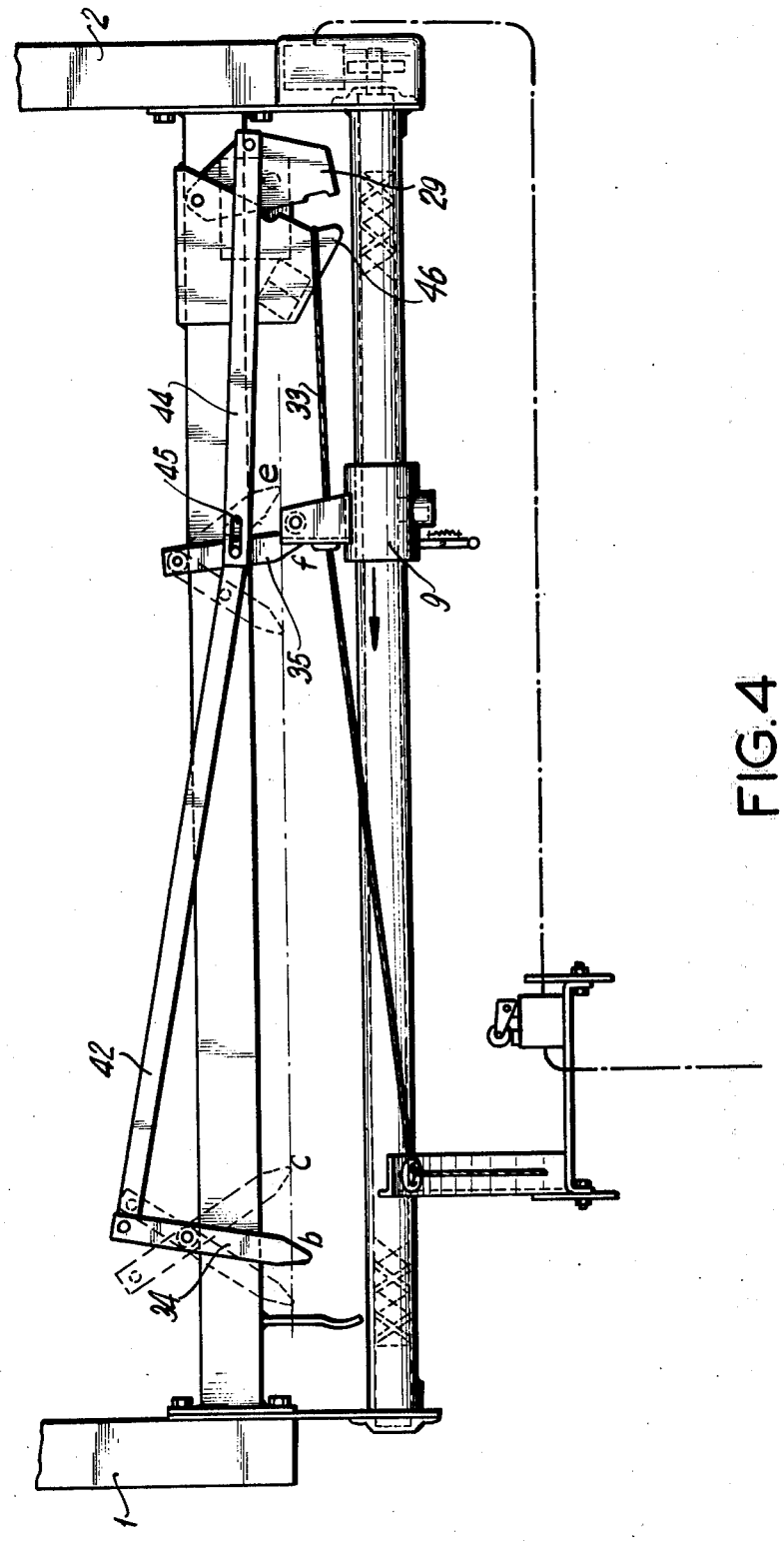
FIG. 4 is a view similar to FIG. 3 showing the twine guide assembly and cutter device in an operating position just prior to the cutter device being closed to a cutting position.

The operation of the binding device according to the present invention for winding twine about a compacted bale is as follows. When a rolled bale 57 is located in the rolling press between the side walls 1 and 2, the binding device 6 is located in a position as shown in FIG. 3. An end 58 of the twine 33 is held in the cutter device by clamping element 29 in a ready or stand-by position for attachment to the bale to commence the winding operation. To place the binding device in operation, the operator of an apparatus, such as a tractor, operating the press which rolls and compacts the bale 57 stops or interrupts feeding of crop material to the rolling press and allows the rolled bale 57 to continue rotating in the direction of arrow 90 by appropriate rotating devices, such as endless bands within the press. Drive motor 17 is then actuated, with power being supplied thereto through electric power line 59. The twine guide assembly 9 then begins to move in a direction toward side wall 1 as the motor 17 causes spindle 13 to rotate. When control roller 12 strikes the nose of control lever 34, it causes it to pivot about bearing 36 and out of the position "a" (as shown in FIG. 3) into the position "b" (as shown in FIG. 4). This results in movement of coupler rods 42 and 44 and causes clamping element 29 to pivot into an open or unclamped position as shown in FIG. 4. The twine 33 is released from the clamping element 29 and falls into the gap 5 between rollers 3 and 4. The end of the twine 33 is caught by the roller 4 or by bale 57. Continued rolling of the bale 57 draws the twine into the gap, winding it around the bale. The twine guiding assembly 9 continues to move axially along the tubular guide member 7 toward the side wall 1 until cam follower 20 reaches the end of the continuous guide slots 18. The cam member 22 on cam follower 20 is then guided in the other continuous slot 18 causing assembly 9 to change directions and move axially along the tubular member 7 toward the other side wall 2. While the assembly 9 moves toward wall 1, the twine is helically wrapped about the rotating bale 57 in a first direction. When the assembly 9 changes direction the twine begins to be wrapped about the bale in the opposite direction and rides over and across the first windings thus causing the twine to be firmly held on the bale. Stop 91 insures proper overlap of the twine onto the first windings, since it limits the position of the twine at one end of the bale during the formation of the first windings when the twine guide assembly is moving toward the side wall 1.

When the twine guide assembly reverses direction and moves toward the side wall 2, the control roller 12 again engages the nose of control lever 34 and moves the lever into the position "c" as shown in FIG. 4. Coupler rod 42 moves with the control lever 34 for a distance equal to the length of slot 45 and then causes similar movement of coupler rod 44 to act on clamping element 29 causing pivotal movement of element 29 into a temporarily clamped position. The clamping element 29 opens again when the roller 12 engages the nose of control lever 35 and moves it out of the position "d" (shown in FIG. 3), and into the position "e" (shown in FIG. 4).

As the twine guide assembly 9 continues to move to the right (toward the side wall 2), the twine 33 is caught by and positioned behind the nose 46 (as shown in FIG. 4) of the cover 26 when the twine guide assembly again reverses direction and starts to move to the left (toward the side wall 1) along spindle 13. As the bale continues to rotate, the strand of twine 33 guided around nose 46 is wrapped about an end of the bale 57 located adjacent the side wall 2 for about two windings thus forming an end border of the winding rather than being helically wrapped about the bale. As the twine guide assembly 9 continues to move toward the side wall 1, roller 12 reaches and engages the nose 39 of control lever 35 in its position "f" (see FIG. 4) causing clamping element 29 to move to its clamped position so that the twine 33 is pressed against the cutter 28. Cutter 28, therefore, cuts the twine to terminate the binding process and the cut end of the twine is clamped by the clamping element 29 and is in position to commence the next binding operation. Just prior to the control roller 12 reaching and engaging the nose of control lever 34, switching arm 54 hits cutout switch 53 thus turning off power to the electrical drive motor 17. The binding operation is completed and the device is in ready position to commence a new binding operation.

Figure 5:
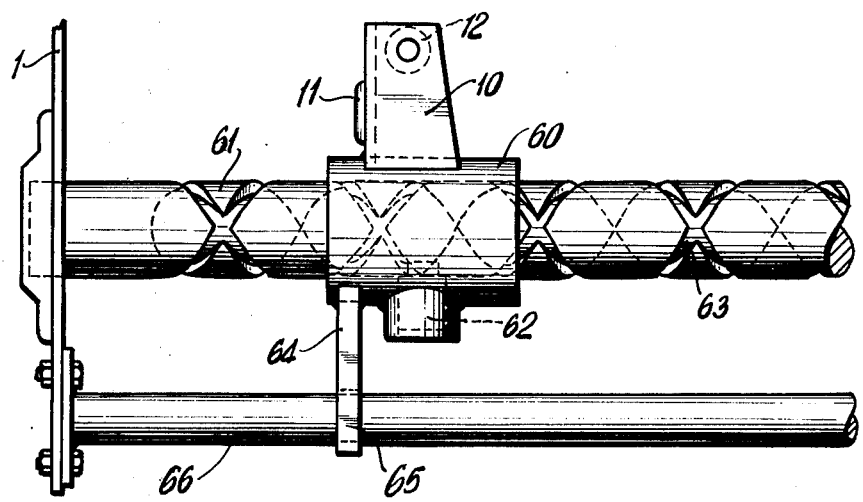
FIGS. 5, 6, and 7 are views similar to that of FIG. 3 illustrating three separate embodiments of means for moving the twine guide assembly rectilinearly.

FIG. 5 illustrates a further embodiment of a twine guide assembly and means for moving the twine guide assembly in a linear direction parallel to the path of the gap between the rollers 3 and 4 and extending between the side walls 1 and 2. The twine guide assembly 60 of this embodiment, is supported for axial movement directly on a reversible screw spindle 61, rather than being supported on a tubular member with the screw spindle rotatably carried therein. In this embodiment, a cam follower 62 carried by the twine guide assembly and radially directed toward the center of the assembly 60 is directly engaged in the guide slot 63 of the reversible screw spindle. A guide element 64 is attached at one end to the twine guide assembly 60 and has a bifurcated opposite end 65 which loosely straddles opposite sides of a guide rail 66 to prevent rotational movement of the twine guide assembly 60 about the screw spindle 61 and to limit the movement of the twine guide assembly 60 to axial rectilineal movement. The guide rail 66 extends between the side walls of the rolling press and is parallel to the reversible screw spindle.

Figure 6:
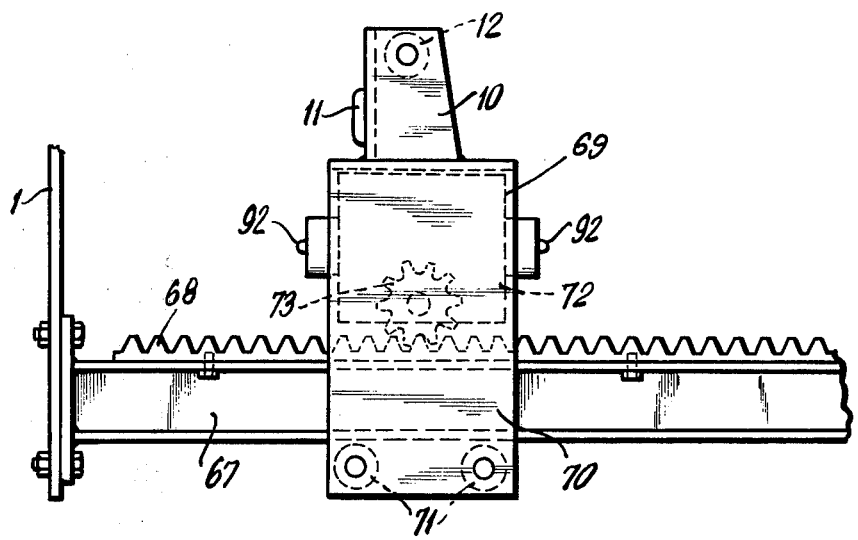

In the embodiment shown in FIG. 6, the twine guide assembly 69 is carried for axial movement along a cross member 67 attached between the side walls 1 and 2. The cross member 67 carries a gear rack 68. A bearing plate 70 is carried by assembly 69 for guiding the assembly on both its upper and lower sides longitudinally along the cross member 67. A pair of rollers 71 carried by the twine guide assembly 69 secures the assembly to the cross member 67 on the front side thereof. The twine guide assembly 69 is secured to the rear side of the cross member 67 by a driving pinion 73, which engages the gear rack 68. Pinion 73 is supported and driven by an electrical drive motor 72 carried by the assembly 69. The motor 72 carries changeover switches 92 on each of its side so that when the twine guide assembly 69 engages either of the side walls 1 or 2, the respective switch 92 will switch over the drive motor 72 for reverse driving operation of the pinion 73 to change the direction of movement of the twine guide assembly 69 on the cross member 67.

Figure 7:
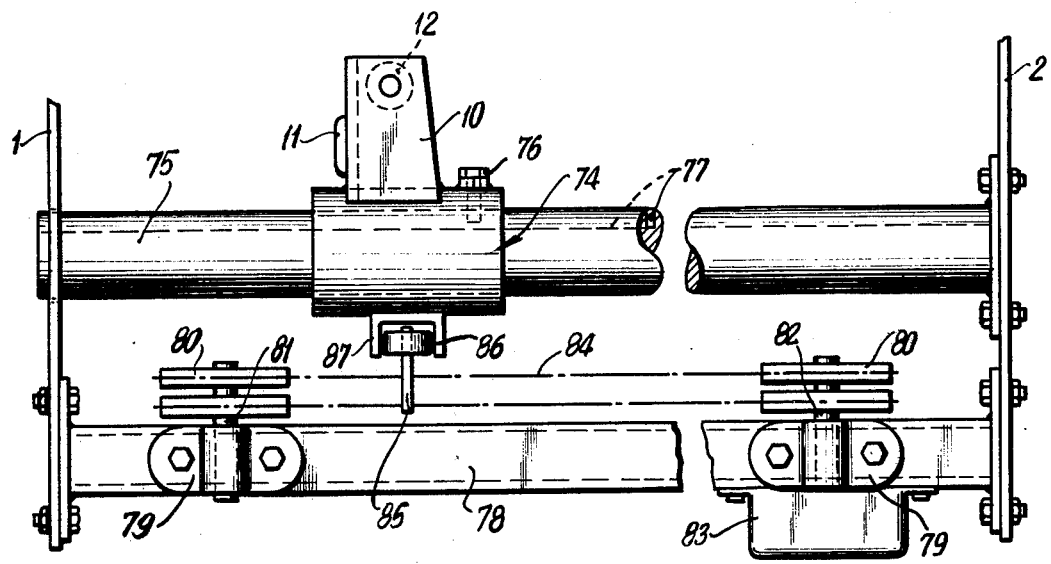
Figure 8:
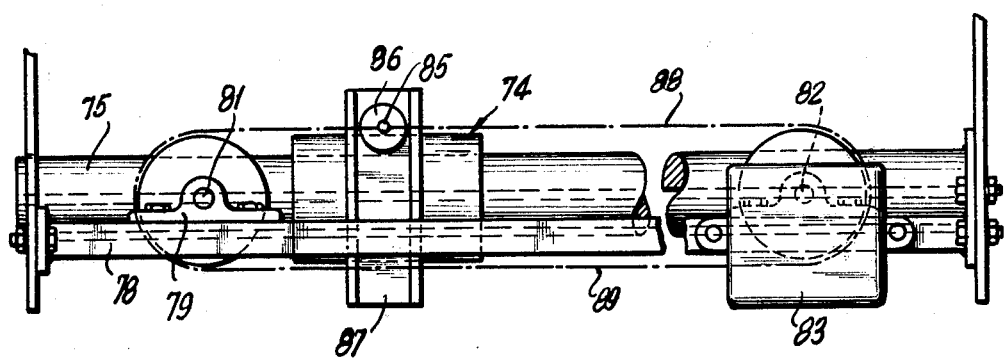
FIG. 8 is a front elevational view illustrating the embodiment of FIG. 7.

FIGS. 7 and 8 illustrate yet a further embodiment of a twine guide assembly. In this embodiment, the twine guide assembly 74 is supported for longitudinal movement on a round steel cross piece 75 anchored between side walls 1 and 2. The twine guide assembly 74 has a set screw 76 extending radially inwardly and engaging a slot 77 extending longitudinally along the cross piece 75 to prevent rotational movement of the twine guide assembly 74 about the cross piece 75. A pair of bearing blocks 79 are attached to a second cross piece 78. Each bearing block 79 is located a distance of approximately 100 millimeters from an adjacent side wall 1 or 2. A double chain wheel 80 is supported by shafts 81 and 82 journaled in each of the bearing blocks 79. Shaft 82 has an extension directed toward the front of the binding device and is coupled with an electric motor 83 supported on the cross piece 78 for driving the chain wheels 80 on shaft 82. A double roller chain 84 is carried on the chain wheels 80 extending between the shafts 81 and 82. A follower bolt 85 is secured to the chain 84 and supports a guide roller 86. The bolt 85 is positioned on the chain 84 so that guide roller 86 engages a U-shaped guide rail 87 extending from the twine guide assembly 74 in a direction perpendicular to the direction of movement of the twine guide assembly 74 along the cross piece 75. The U-shaped guide rail 87 is sufficiently long that it will embrace the guide roller 86 as it moves in one direction along the upper run 88 of the chain 84 and as it moves in the opposite direction along the lower run 89 of the chain 84. Longitudinal movement of the twine guide assembly 74 is thus effected by operation of the chain drive 80, 84 and cooperative engagement between the guide roller 86 and the guide rail 87.

While the invention has been described and illustrated with respect to certain preferred embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A device for helically winding twine about a bale of agricultural crop material rolled and compacted in a press having a gap through which the crop material is fed into the press comprising a movably mounted twine guide assembly for guiding the twine through the gap into the press, a cutter device operatively controlled by movement of said twine guide assembly for cutting the twine, and means supporting said twine guide assembly for movement in a rectilinear path parallel to the axis about which the bale is rolled.

2. A device according to claim 1 wherein said means supporting said twine guide assembly comprises a cross member mounted and arranged to extend across the press in the axial direction of the bale being formed, a screw spindle carried by said cross member, and means carried by said twine guide assembly cooperating with said screw spindle for causing said twine guide assembly to move axially and rectilinearly therealong when said screw spindle is rotated.

3. A device according to claim 2 wherein said screw spindle has guide slots engageable by said means carried by said twine guide assembly for causing said twine guide assembly to move in reversible directions therealong.

4. A device according to claim 3 wherein said cross member is a tubular member, said screw spindle being rotatably mounted therein, said twine guide assembly having a cylindrical bore accommodating said tubular guide member so as to be axially slidable therealong, and wherein said means for causing sliding movement of said twine guide assembly axially along said tubular member comprises a cam follower mounted on said twine guide assembly and engaging the slots of said screw spindle, and a longitudinally extending slot formed in said tubular guide member for receiving said cam follower to prevent rotational movement of said twine guide assembly thereabout.

5. A device according to claim 3, wherein said cross member is formed by said screw spindle, said twine guide assembly having a cylindrical bore for accommodating said screw spindle so as to be axially movable therealong, and wherein said means for causing said twine guide assembly to be axially movable along said screw spindle comprises a cam follower mounted on said twine guide assembly and engaging the slots of said screw spindle, and further comprising means for preventing said twine guide assembly from rotating on said screw spindle as said twine guide assembly is axially moved therealong, which includes a guide rail arranged to be mounted on the press and to extend in the axial direction of the bale being rolled and extending parallel to said screw spindle, and a guide member mounted on said twine guide assembly being engaged with said guide rail.

6. The device according to claim 2 further comprising drive means connected with said screw spindle for rotatably driving said screw spindle to cause axial movement of said twine guide assembly along said cross member.

7. A device according to claim 1 further comprising a chain drive assembly arranged to be carried on the press and to extend in the axial direction of the bale being rolled, said chain drive assembly arranged to extend across the entire width of the press, and means carried by said chain drive assembly engaging a guide rail mounted on said twine guide assembly operatively linking said chain drive assembly to said twine guide assembly for causing axial movement thereof along said cross member as said chain drive assembly is driven.

8. The device according to claim 7 further comprising means connected with said chain drive assembly for driving said assembly to cause axial movement of said twine guide assembly along said cross member.

9. A drive according to claim 1 further comprising drive means cooperating with said twine guide assembly for causing movement thereof along said supporting means.

10. A device according to claim 9 wherein said drive means is electrical drive means.

11. The device according to claim 9 wherein said drive means is mechanical drive means.

12. The device according to claim 9 further comprising means for automatically disconnecting said drive means actuatable by the relative position of said twine guide assembly longitudinally along said supporting means.

13. The device according to claim 12 further comprising a clamping element pivotally carried on said cutter device for movement between a clamped position for holding the twine and an unclamped position, a pair of control levers pivotally supported between the ends of said supporting means and operatively linked with said clamping element, and an actuating member carried by said twine guide assembly for engaging said control levers as said twine guide assembly is driven along said supporting means for causing movement of said clamping element between said clamped and unclamped positions, whereby said actuating member engages one of said control levers for causing movement of said cutter device into a cutting position when said twine guide assembly has moved to a position adjacent one of said side walls and wherein said cutting device is reset to an initial position by engagement of said actuating member with the other of said control levers when said twine guide assembly has moved to a position adjacent the other end of said supporting means and then back to an intermediate position, said drive means comprising an electric motor arranged to be carried on the press, and wherein said means for automatically disconnecting said drive means comprises a cutout switch arranged to be mounted on the press, and a switching arm carried by said twine guide assembly for engaging said cutout switch to disengage said motor at a position prior to said twine guiding assembly operating said cutter device.

14. The device according to claim 1 further comprising drive means carried by said twine guide assembly for causing movement thereof longitudinally along said supporting means.

15. The device according to claim 14 wherein said means supporting said twine guide assembly comprises a cross member extending parallel to the axis about which the bale is rolled, and wherein said means for causing movement of said twine guide assembly along said cross member comprises a gear rack carried by said cross member, a pinion gear rotatably carried on said twine guide assembly positioned for engagement with said gear rack, and a reversible electric motor for rotatably driving said pinion to cause movement of said twine guide assembly longitudinally along said cross member.

16. The device according to claim 1 further comprising a clamping element pivotally carried on said cutter device for movement between a clamped position for holding the twine and an unclamped position, a pair of control levers pivotally supported between the end of said supporting means and operatively linked with said clamping element, and an actuating member carried by said twine guide assembly for engaging said control levers to cause movement of said clamping element between said clamped and unclamped positions.

17. The device according to claim 16 wherein said actuating member engages one of said control levers for causing movement of said cutter device into a cutting position when said twine guide assembly has moved to a position adjacent one end of said supporting means, and wherein said cutting device is reset to an initial position by engagement of said actuating member with the other of said control levers when said twine guide assembly has moved to a position adjacent the other end of said supporting means and then back to an intermediate position.

* * * * *